Patented Oct. 6, 1942

2,298,129

UNITED STATES PATENT OFFICE 2,298,129

TREATMENT OF WELLS

Carroll R. Irons, Midland, Mich., assignor to The Dow Chemical Company, Midland, Mich., a corporation of Michigan No Drawing. Application March 29, 1938, Serial No. 198,731

1 Claim. (Cl. 252—8.55)

The invention relates to a method of bringing about the deposition of a consolidating and sealing deposit within the pores of an earth or rock formation, and more particularly concerns a method whereby such a deposit may be produced within the pores and flow channels of the formation penetrated by the bore of a well so as to render such formation resistant to caving and impermeable to the flow of fluids.

In drilling deep wells, such as, for example, oil wells, the bore of the well often penetrates loose and caving strata or strata producing brine, water or other undesirable fluids. It is usually desirable to bring about solidification of the loose and caving portions of the formation as well as prevent the infiltration of the undesirable fluids into the well bore, because otherwise portions of the formation may slough off into the bore necessitating a cleaning operation, or the flow of oil into the well may be contaminated, and in some cases actually prevented, by excessive flow of the undesirable fluids.

It has heretofore been proposed to bring about a reduction in the flow of such undesirable fluids and consolidation of the formation by injecting thereinto a solution of a chemical reagent which will react to produce a precipitate with the formation waters or with a second solution of a chemical reagent successively injected into the pores of the formation. However, there are disadvantages attending the use of this method which usually prevent an effective seal from being formed, as well as resulting in little or no consolidation of the formations. For example, the volume of the solids deposited from the solutions of the chemical reagents is always substantially less than the volume of the liquids from which they are deposited. This results in only partial sealing of the pores and flow channels and complete sealing is not obtained even by repeating the operation a number of times.

Another disadvantage inherent in the use of the conventional method lies in the fact that the amount of precipitate produced is directly proportional to the extent of the mixing that takes place between the precipitating solutions. Experimentation has shown that within the minute pores and flow channels of the formation it is difficult if not impossible to secure intimate mixing of the solutions, because one solution tends to drive the other ahead of it into the formation and substantially all of the mixing and reaction of the solutions occurs at the point of contact of the two liquids. After this initial reaction has taken place, the two solutions are thereafter separated from each other by a layer of reacted inactive solution and further reaction does not take place readily.

Still another disadvantage of the conventional method lies in the type of precipitate produced. These precipitates are usually in the form of small particles which do not bond or adhere strongly to the formation or to themselves, and, therefore, do not consolidate the formation or render it strongly resistant to caving.

It is therefore an object of the invention to provide a method of converting porous formations into a fluid impermeable mass possessing high mechanical strength unaffected by water, oil or gas.

Another object is to provide a method of treating deep well bores and formations adjacent thereto to produce therein a consolidating solid deposit which is capable of preventing caving or sloughing of the well bore walls.

A further object is to furnish a sealing material which will of itself set up into a strongly coherent and adherent deposit.

Other objects and advantages will be apparent as the description of the invention proceeds.

In accordance with the method of the invention a molten metal, preferably one having a relatively low melting point, is injected into the portion of the formation to be sealed and allowed to solidify in situ. By the term "metal" used herein and in the appended claim is meant either one of the metal elements or an alloy of such element. Many metals are available which are solids at the temperature encountered in well formations, but which if heated to slightly elevated temperature become molten and highly fluid so that they may be easily injected or forced into the pores and flow channels of the earth formation. I have found that by depositing such a molten metal in a fluid permeable earth or rock formation and allowing it to solidify in situ, the formation is not only consolidated and strengthened but also rendered impermeable to the flow of fluids. Such a sealing material is highly insoluble in the well fluids such as brine and water.

The foregoing method of treating earth or rock formations to bring about consolidation, reduction in permeability, and the like has the advantage that mixing of two solutions within the pores of the formation is not required; the solid deposit formed occupies substantially the same or a greater volume than that of the liquid injected into the formation to form the seal; and the deposit formed is of great mechanical strength and strongly bonds not only to itself but to the formation. Hence the consolidating and pore plugging effect produced by the present method is far greater than that attainable with the conventional methods.

In carrying the invention into effect a molten metal is introduced into the earth or rock and, if necessary, held in place by the application of pressure until cooling and solidification has occurred. Various metals are known which are suitable for the purpose at hand. In general one of the commonly known low melting point alloys having a melting point slightly above the temperature of the formation to be sealed is preferably employed, and, if desired, an alloy having the property of expanding upon solidifying, such as certain of the bismuth alloys, may be selected. The following are specific examples of metals generally suitable for the purpose at hand:

EXAMPLE 1
*Fusible alloy*

Melting point 200° C.

Composition:

| | Per cent |
|---|---|
| Pb | 20 |
| Sn | 80 |

EXAMPLE 2
*Wood's metal*

Melting point 65.5° C.

Composition:

| | Per cent |
|---|---|
| Bi | 50 |
| Pb | 25 |
| Sn | 12.5 |
| Cd | 12.5 |

EXAMPLE 3
*Rhine metal*

Melting point 300° C.

Composition:

| | Per cent |
|---|---|
| Sn | 97 |
| Cu | 3 |

EXAMPLE 4
*Lipowitz alloy*

Melting point 70° C.

Composition:

| | Per cent |
|---|---|
| Bi | 50 |
| Pb | 27 |
| Sn | 13 |
| Cd | 10 |

EXAMPLE 5
*White metal*

Melting point 238° C.

Composition:

| | Per cent |
|---|---|
| Pb | 75 |
| Sb | 19 |
| Sn | 5 |
| Cu | 1 |

EXAMPLE 6
*Bismuth solder*

Melting point 111° C.

Composition:

| | Per cent |
|---|---|
| Bi | 40 |
| Pb | 40 |
| Sn | 20 |

Instead of the alloys listed above, the metals lead, tin, and zinc, the melting points of which are 327.5° C., 231° C. and 419° C., respectively, may be suitably used.

A treatment of a well in accordance with the method of the invention to shut off the infiltration of water occurring from a stratum adjacent the lower portion of the well bore is carried out in the following manner. Any fluid standing in the well is first removed from the well bore, preferably by forcing it back into the formation by applying pressure at the casing head, as by pumping gas into the well. A quantity of a low melting point metal, preferably in relatively small pieces, is then introduced into the well through the casing head and allowed to drop to the bottom of the well. An electric heating unit of conventional type is then lowered into the well and heat applied to the solid metal to melt it. The time required for this operation may be readily determined from a knowledge of the amount of the alloy used, its melting point, and the amount of heat liberated by the heater. After sufficient time has elapsed to insure the metal being completely melted, pressure is applied to the well at the casing head to displace the molten metal from the well bore and force it into the pores and flow channels of the formation. For this purpose a gas under pressure is preferably employed. The current being supplied to the heater is then shut off and the molten metal is allowed to solidify, pressure being maintained upon it if necessary to prevent its returning to the well bore before solidification. After solidification of the metal has taken place the heater may be withdrawn and the well put into production.

In general enough of the metal should be used for a treatment to fill the well bore over the depth of the formation to be sealed or consolidated. More may be required in some cases and may be added while the heater is in place, preferably after the metal first introduced has been displaced from the well bore, or the treatment may be repeated until the desired sealing and consolidating effect is produced.

Modification of the described method may be suitably used in some instances. For example, other methods of heating or melting the metal in the well may be used, as by circulating superheated steam or other gas down the tubing of the well. In some cases it may be desirable to circulate a cold fluid down the well after the molten metal has been forced into the desired stratum or portion thereof to aid in bringing about solidification. It is to be understood that while the method has been described with particular reference to shutting off the infiltration of brine occurring at a point adjacent the lower portion of the well bore, the method may be used to seal off the infiltration of fluids occurring from other sections of the well bore. The method may also be advantageously employed to form a bottom hole plug, and by using a metal capable of expanding upon solidification, a more effective plug can be produced.

Other modes of applying the principle of my invention may be employed instead of those explained, change being made as regards the method herein disclosed, provided the step or steps stated by the following claim or the equivalent of such stated step or steps be employed.

I therefore particularly point out and distinctly claim as my invention:

In a method of treating an earth or rock formation penetrated by a well bore to bring about consolidation and sealing, the steps which consist in introducing a quantity of a metal into the well bore, said metal being characterized by having a relatively low but higher melting point than the temperature of the formation, applying heat to melt the metal in the well bore, displacing the molten metal from the well bore into the formation by application of fluid pressure, and introducing a relatively cold fluid into the well to bring about solidification of the metal.

CARROLL R. IRONS.